(12) United States Patent
Cho (10) Patent No.: US 7,836,471 B2
(45) Date of Patent: Nov. 16, 2010

(54) APPARATUS FOR RECEIVING SATELLITE DMB AND METHOD THEREOF

(75) Inventor: Nam-Shin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 1145 days.

(21) Appl. No.: 11/223,392

(22) Filed: Sep. 8, 2005

(65) Prior Publication Data

US 2006/0064727 A1 Mar. 23, 2006

(30) Foreign Application Priority Data

Sep. 8, 2004 (KR) .................... 10-2004-0071743

(51) Int. Cl.
*H04N 7/20* (2006.01)
*H04L 27/22* (2006.01)
(52) U.S. Cl. .................... 725/68; 455/3.02; 375/147
(58) Field of Classification Search .................... None
See application file for complete search history.

(56) References Cited

U.S. PATENT DOCUMENTS

| 6,198,719 | B1 * | 3/2001 | Faruque et al. | 370/209 |
| 6,606,724 | B1 * | 8/2003 | Krieger et al. | 714/755 |
| 7,113,538 | B1 * | 9/2006 | Chen et al. | 375/150 |
| 7,443,906 | B1 * | 10/2008 | Bang et al. | 375/140 |
| 2004/0109493 | A1 * | 6/2004 | Blessent et al. | 375/146 |
| 2006/0015908 | A1 * | 1/2006 | Vermola et al. | 725/63 |

FOREIGN PATENT DOCUMENTS

| JP | 10-294930 | | 11/1998 |
| JP | 2000-115003 | | 4/2000 |
| JP | 200115003 | A * | 4/2000 |
| JP | 2000115003 | A * | 4/2000 |
| JP | 2001-268027 | | 9/2001 |
| JP | 2001-274774 | | 10/2001 |
| JP | 2003-274303 | | 9/2003 |
| JP | 2003-274304 | | 9/2003 |
| KR | 2004-0038280 | | 5/2004 |
| KR | 1020050035625 | A | 4/2005 |

OTHER PUBLICATIONS

ETRI, "Satellite Mobile Service Initiatives in Korea", Jun. 6, 2004, pp. 1-36, available at http://www.isi-initiative.eu.org/getASMdoc.php?id=20.

* cited by examiner

*Primary Examiner*—Andrew Y Koenig
*Assistant Examiner*—Rong Le
(74) *Attorney, Agent, or Firm*—Lee, Hong, Degerman, Kang & Waimey (57) ABSTRACT

Disclosed are an apparatus for receiving a satellite DMB capable of minimizing a video broadcast channel switching time and a method thereof. In the method, time taken to bit de-interleave broadcasting data of the video broadcast channel is reduced thereby to minimize a delay time generated at the time of switching channels. In a satellite DMB receiver having a CDM demodulator for demodulating broadcasting data coded by a Walsh code and having a broadcasting data channel decoding unit for decoding the coded broadcasting data, the satellite DMB receiving apparatus comprises a CDM demodulator for demodulating a Walsh code of at least one broadcast channel, and at least one broadcasting data channel decoding unit for decoding more than one broadcast channel, and a selecting unit for selecting a channel to be viewed by a user.

14 Claims, 6 Drawing Sheets

| Broadcasting Channel (CH) No. | Allocated Walsh Code No. |
|---|---|
| CH1 | W4, W5 |
| CH2 | W6, W7 |
| CH3 | W21, W22 |
| CH4 | W10 |
| CH5 | W10 |
| CH6 | W10 |
| CH7 (Lower broadcasting CH) | W11, W12 (Lower Walsh code) |
| CH8 (Current broadcasting CH being watched) | W14, W15 (Current Walsh code) |
| CH9 (Upper broadcasting CH) | W16, W17 (Upper Walsh code) |
| CH10 | W18, W19 |
| CH11 | W13 |
| CH12 | W13 |
| CH13 | W13 |

| Broadcasting Channel (CH) No. | Allocated Walsh Code No. |
|---|---|
| CH1 | W4, W5 |
| CH2 | W6, W7 |
| CH3 | W21, W22 |
| CH4 | W10 |
| CH5 | W10 |
| CH6 | W10 |
| CH7 ← Lower broadcasting CH | W11, W12 ← Lower Walsh code |
| CH8 ← Current broadcasting CH being watched | W14, W15 ← Current Walsh code |
| CH9 ← Upper broadcasting CH | W16, W17 ← Upper Walsh code |
| CH10 | W18, W19 |
| CH11 | W13 |
| CH12 | W13 |
| CH13 | W13 |

FIG.4

| PRESET | Broadcasting Channel (CH) No. | Allocated Walsh Code No. | |
|---|---|---|---|
| 1 | CH1 | W1, W5 | |
| 2 | CH3 | W21, W22 | |
| 3 | CH7 | W11, W12 | ← Lower Walsh code |
| ▶4 | CH8 | W14, W15 | ← Current Walsh code |
| 5 | CH10 | W18, W19 | ← Upper Walsh code |

Current broadcasting CH Being watched (→ row 4)

APPARATUS FOR RECEIVING SATELLITE DMB AND METHOD THEREOF

CROSS-REFERENCE TO RELATED APPLICATIONS

Pursuant to 35 U.S.C. §119(a), this application claims the benefit of earlier filing date and right of priority to Korean Application No. 71743/2004 filed Sep. 8, 2004, the contents of which are hereby incorporated by reference herein in its entirety.

FIELD OF THE INVENTION

The present invention relates to satellite digital multimedia broadcasting (DMB), and more particularly, to an apparatus for receiving a satellite DMB based on a system E method capable of minimizing the switching time of changing from one video broadcast channel to another and a method thereof.

BACKGROUND OF THE INVENTION

Generally, digital multimedia broadcasting (DMB) is a more enhanced digital broadcasting technique than a digital broadcasting technique for an audio only service, and DMB refers to a communication service for providing an audio service and a video service to a plurality of channels.

DMB provides high quality sound and pictures (similar or equal to CD or DVD quality) through a personal digital assistant (PDA) or a vehicle terminal that may be used while in motion. The DMB service is classified into a system A, a system Dh, and a system E.

System A is based on an orthogonal frequency division multiplexing (OFDM) applied to an SDMB and an European TDMB, and the system Dh uses a method for receiving a satellite DMB based on a terrestrial DMB. Also, the system E uses a code division multiplexing (CDM) method and is applied to a satellite DMB.

Figure 1:
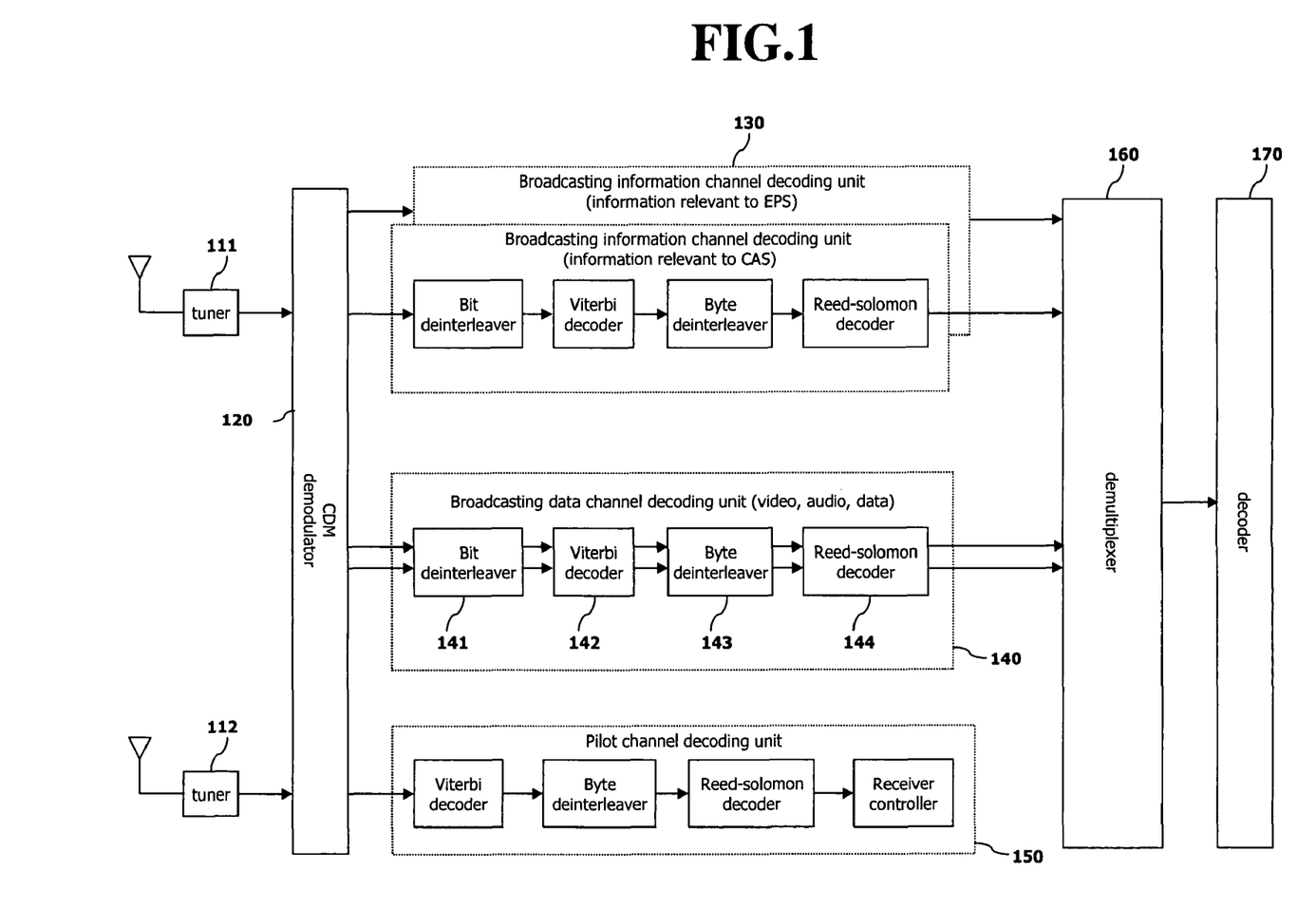
FIG. 1 is a block diagram showing a satellite DMB receiving apparatus in accordance with the related art.

FIG. 1 is a block diagram showing a satellite DMB receiving apparatus based on a system E in accordance with the related art. As shown, the related art satellite DMB receiving apparatus comprises tuners 111 and 112, a CDM demodulator 120, a broadcasting information channel decoding unit 130, a broadcasting data channel decoding unit 140, a pilot channel decoding unit 150, a demultiplexer 160, and a decoder 170.

The tuners 111 and 112 demodulate a satellite DMB signal into a base band signal, and provides the base band signal to the CDM demodulator 120 for demodulation thereby extracting broadcasting information such as program specification information (PSI) and service information (SI). The CDM demodulator 120 provides the extracted broadcasting information to the broadcasting information channel decoding unit 130 for decoding using two Walsh codes[1]. The broadcasting information channel decoding unit 130 provides broadcasting data information such as video and audio data to the broadcasting data channel decoding unit 140. Also, the CDM demodulator 120 extracts control information of a receiver by using one Walsh code and provides the control information to a pilot channel decoding unit 150.

[1] Walsh code is one of 64 chip patterns, which are 64 chips long, used to differentiate CDMA channels.

Each decoder 130, 140, and 150 uses Welch codes to decode the signal received from the CDM demodulator and then provides the resultant information to the demultiplexer 160.

The demultiplexer 160 demultiplexes information provided by each decoder 130, 140, and 150 and provides the output to the decoder 170, and the decoder 170 provides an images to a channel selected by a user.

As shown in FIG. 1, the broadcasting data channel decoding unit 140 of the related art satellite DMB receiving apparatus comprises a bit de-interleaver 141, a viterbi decoder 142, a byte de-interleaver 143, and a Reed-Solomon[2] decoder 144. Each component comprises a pair for decoding two Walsh codes.

[2] Reed-Solomon error correction is a coding scheme that works first by constructing a polynomial from the data symbol to be transmitted, and then by sending an over-sampled plot of the polynomial instead of the original symbol itself The broadcasting data channel decoding unit 140 comprises a bit de-interleaver 141 for de-interleaving broadcasting data of a broadcast channel into a bit unit, a viterbi decoder 142 for decoding the deinterleaved broadcasting data of a broadcast channel coded into a convolution channel, a byte de-interleaver 143 for de-interleaving the decoded data into a byte unit, and a Reed-Solomon decoder 144 for decoding a byte outputted from the byte de-interleaver 143.

The broadcasting data decoded by the decoders 141 to 144 is demultiplexed by the demultiplexer 160 and provided to the decoder 170. The decoder 170 decodes the demultiplexed signal, thereby providing a video broadcasting signal for viewing.

However, the related satellite DMB receiving apparatus has the following problem. When the user switches to another broadcast channel while watching a first video broadcast channel, the CDM demodulator 120 performs a CDM demodulation for the Walsh code corresponding the new broadcast channel and decodes the demodulated broadcasting signal. The bit de-interleaving takes approximately 264 msec~6.514 sec per bit to perform for a total bit-de-interleaving time of approximately 3.257 sec.

Accordingly, when changing from one broadcast channel of the satellite DMB receiving apparatus to another, the user experiences a delay of approximately 5~8 seconds thereby causing difficulty in watching a video broadcast on the desired channel.

BRIEF DESCRIPTION OF THE INVENTION

Therefore, an object of the present invention is to provide a satellite DMB receiving apparatus capable of minimizing a delay time incurred by switching from one video broadcast channel to another, and a method thereof.

To achieve these and other advantages and in accordance with the purpose of the present invention, as embodied and broadly described herein, a satellite DMB receiving apparatus is provided, the apparatus comprising: a CDM demodulator for demodulating Walsh encoded data of at least one broadcast channel; and a broadcasting data channel decoding unit for decoding broadcasting data of more than one channel.

Preferably, the broadcasting data channel decoding unit comprises a first decoder for decoding broadcasting data of each channel, and a selecting unit for selecting broadcasting data of a broadcast channel selected by the user among the broadcasting data of each broadcast channel decoded by the first decoder. The broadcasting data channel decoding unit then decodes the selected broadcasting data.

Preferably, the broadcasting data channel decoding unit further comprises a second decoder for decoding broadcasting data of the selected broadcast channel.

To achieve these and other advantages and in accordance with the purpose of the present invention, as embodied and broadly described herein, there is also provided a satellite DMB receiving method, comprising: CDM-demodulating broadcasting data of at least one broadcast channel; decoding the demodulated broadcasting data of at least one broadcast channel; selecting broadcasting data of a broadcast channel by a user; decoding the selected broadcasting data of the broadcast channel; and demultiplexing the selected broadcasting data thereby processing the broadcasting data into an image.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings. Hereinafter, preferred embodiments of the present invention will be explained with reference to the attached drawings.

The present invention provides a satellite DMB receiving apparatus capable of minimizing a channel switching time at the time of conversion of a broadcast channel and enabling a user to conveniently watch a broadcast channel by decreasing the time taken for de-interleaving broadcasting data of a video broadcast channel.

Figure 2:
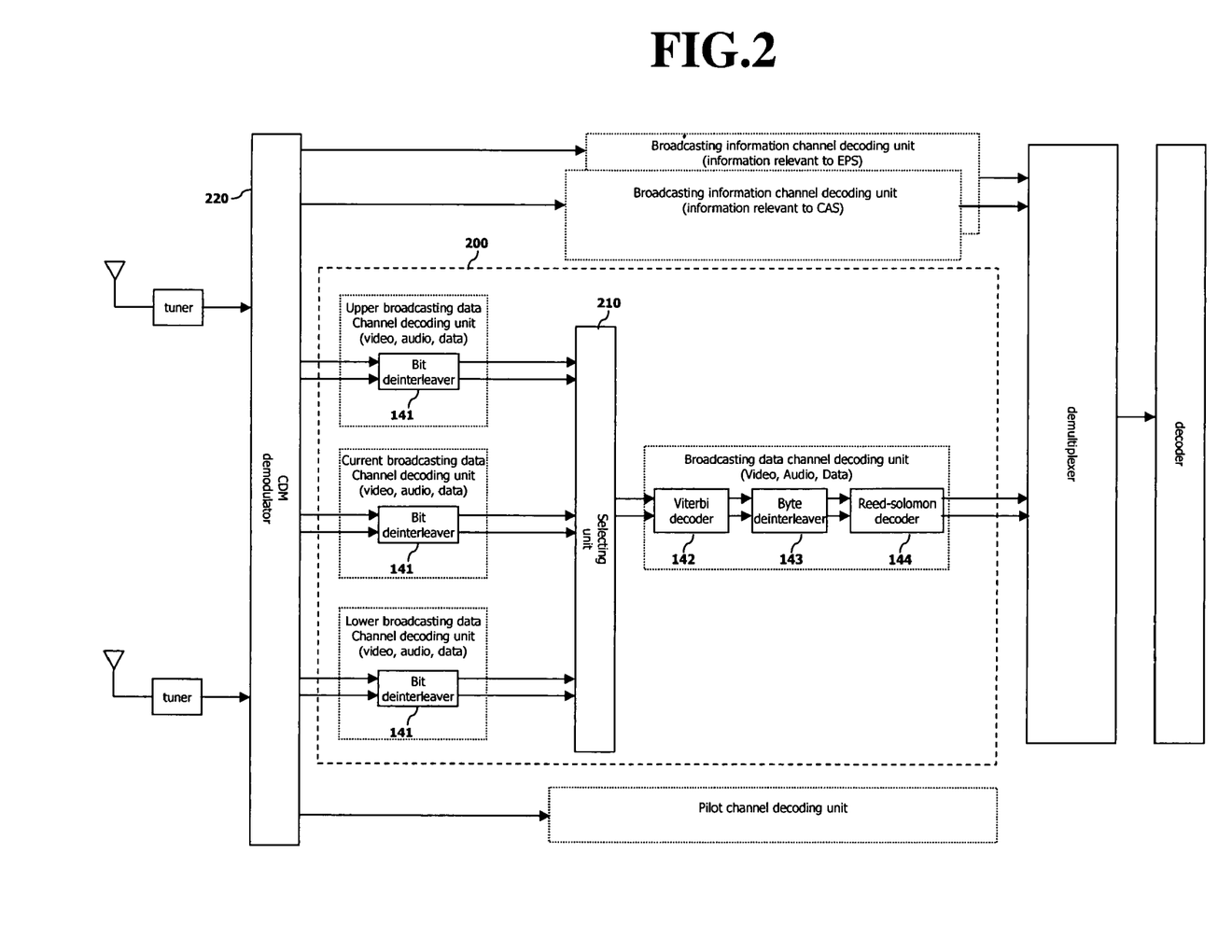
FIG. 2 is a block diagram showing a satellite DMB receiving apparatus based on a system E according to a first embodiment of the present invention.

FIG. 2 is a block diagram showing a satellite DMB receiving apparatus based on a system E according to a first embodiment of the present invention, wherein the satellite DMB receiving apparatus according to the present invention is the same as the related art satellite DMB receiving apparatus based on a system E except for a broadcasting data channel decoding unit. Accordingly, the same reference numerals were given to the same components as those of the related art satellite DMB receiving apparatus.

Referring to FIG. 2, a broadcasting data channel decoding unit 200 of the satellite DMB receiving apparatus according to the present invention comprises: three bit de-interleavers 141 for bit de-interleaving CDM demodulated broadcasting data; a selecting unit 210 for providing bit de-interleaved broadcasting data of one of three broadcast channels selected by a user; and decoders for decoding broadcasting data transmitted from the selecting unit, the decoders further comprising: a viterbi decoder 142, a byte de-interleaver 143, and a Reed-Solomon decoder 144. Each of the decoders 141 to 144 is constructed as a pair of decoders in order to decode the broadcasting data using two Walsh codes.

The operation of the inventive satellite DMB receiving apparatus is explained as follows. Explanations for the same parts as those of the related art satellite DMB receiving apparatus will be omitted. A DMB broadcast channel is composed of a video channel, an audio channel, and a data channel. Hereinafter, the satellite DMB receiving apparatus of the present invention will be explained based on the video channel.

Referring to FIG. 2, when a user selects a desired broadcast channel, a tuner receives a satellite DMB signal of a high frequency according to the selected channel, demodulates the high frequency signal into a base band signal, and provides the signal to a CDM demodulator 220. The base band signal provided to the CDM demodulator 220 from the tuner is broadcast data encoded with at least one Walsh code. The CDM demodulator 220 demodulates the broadcasting data of each of three broadcast channels, thereby extracting broadcasting data having a bit stream format and providing the broadcasting data to each of three bit de-interleavers 141, one de-interleaver 141 for each channel. Each of the three bit de-interleavers 141 is constructed as a pair of bit de-interleavers having a bit stream format according to each channel.

The three broadcast channels include a currently selected broadcast channel, an upper broadcast channel, and a lower broadcast channel.

A selecting unit 210 provides broadcasting data corresponding to the selected channel to the viterbi decoder 142, the byte de-interleaver 143, and the Reed-Solomon decoder 144. The resultant broadcasting data then is demultiplexed and decoded, thereby being processed into an image.

If the user switches from the current broadcast channel to the upper or lower broadcast channel, the upper or lower broadcast channel then becomes the user's current broadcast channel. Also, the upper and lower broadcast channels are reset based on the current broadcast channel. Broadcasting data corresponding to the reset three broadcast channels is CDM-demodulated and provided to the bit de-interleavers 141 according to each broadcast channel.

Figure 3:
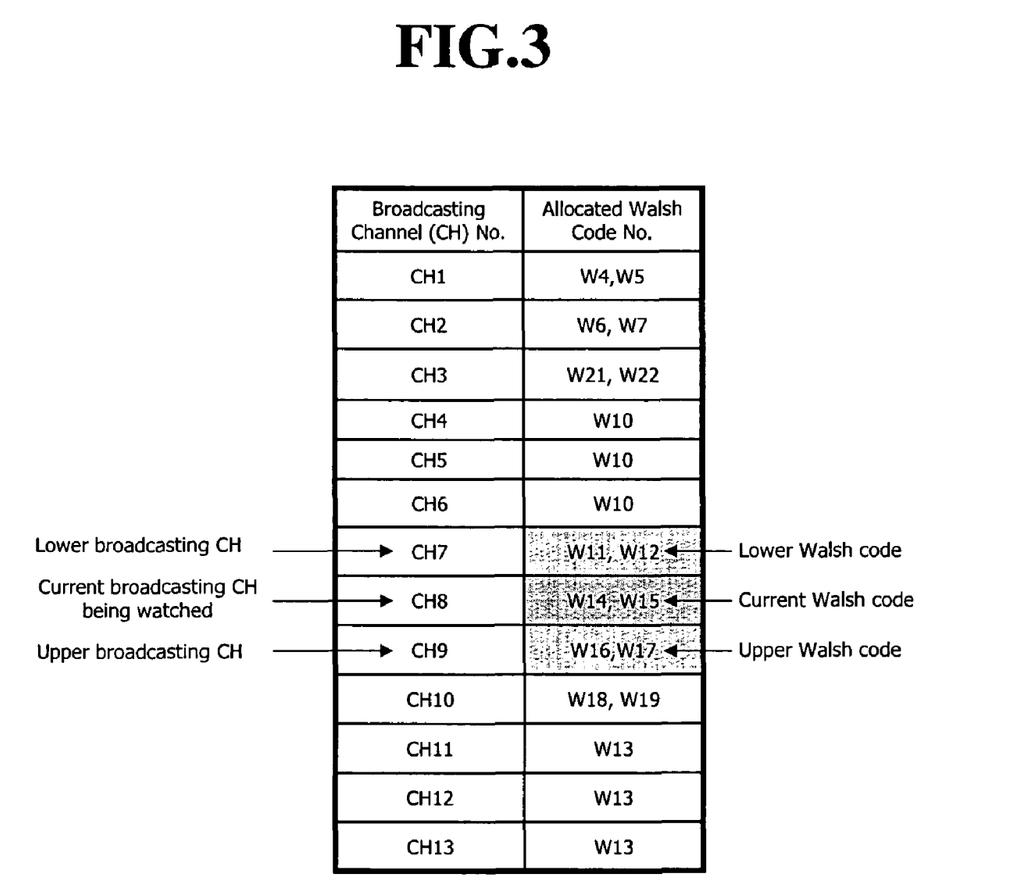
FIG. 3 is a chart showing broadcast channels of a DMB receiving apparatus to which Walsh codes are allocated according to the first embodiment of the present invention.

FIG. 3 is a chart showing broadcast channels of a DMB receiving apparatus to which Walsh codes are allocated according to the first embodiment of the present invention.

Referring now to FIG. 3, if the broadcast channels are video channels, two Walsh codes (for example, W21 and W22) are allocated to the broadcast channel, in this example, CH3. If the broadcast channels are audio channels, one Walsh code (W10) is allocated to three audio broadcast channels (CH4, CH5 and CH6).

As shown in FIG. 3, if the user has selected broadcast channel CH8, the lower broadcast channel is CH7 and the upper broadcast channel is CH9. Walsh codes W14 and W15 are allocated to the current broadcast channel CH8, lower Walsh codes W11 and W12 are allocated to the lower broadcast channel CH7, and upper Walsh codes W16 and W17 are allocated to the upper broadcast channel CH9.

Figure 4:
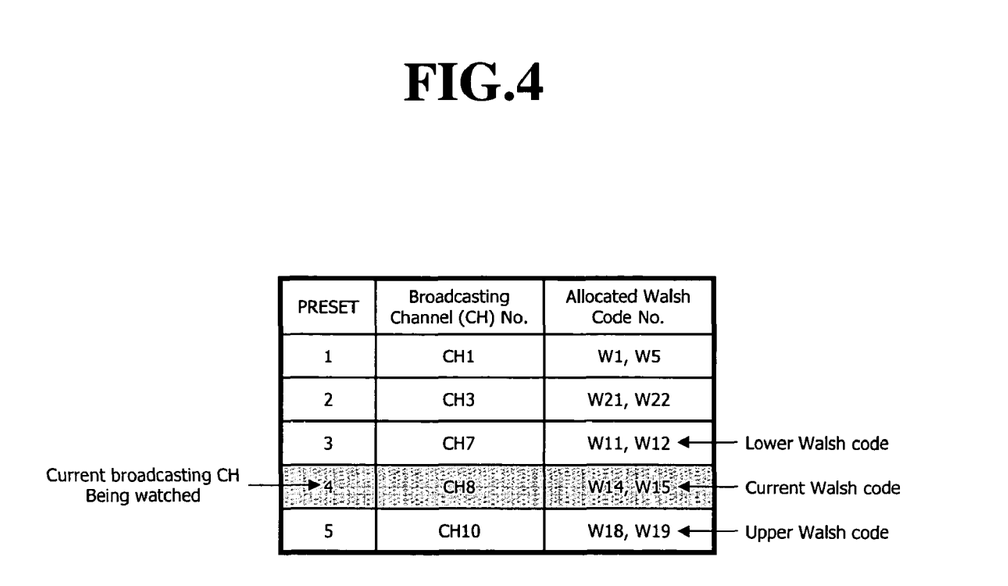
FIG. 4 is a chart showing preset broadcast channels according to the first embodiment of the present invention.

FIG. 4 shows preset broadcast channels according to the first embodiment of the present invention, wherein the preset broadcast channels are determined by the user. The user may conveniently switch from one preset channel to another preset channel. FIG. 4 shows one example of the user's preset channels selected from the video broadcast channels shown in FIG. 3.

As shown in FIG. 4, if the user selected broadcast channel CH8 having Walsh codes W14 and W15, CH7 is the lower broadcast channel having Walsh codes W11 and W12, and CH10 is the upper broadcast channel having Walsh codes W18 and W19.

Figure 5:
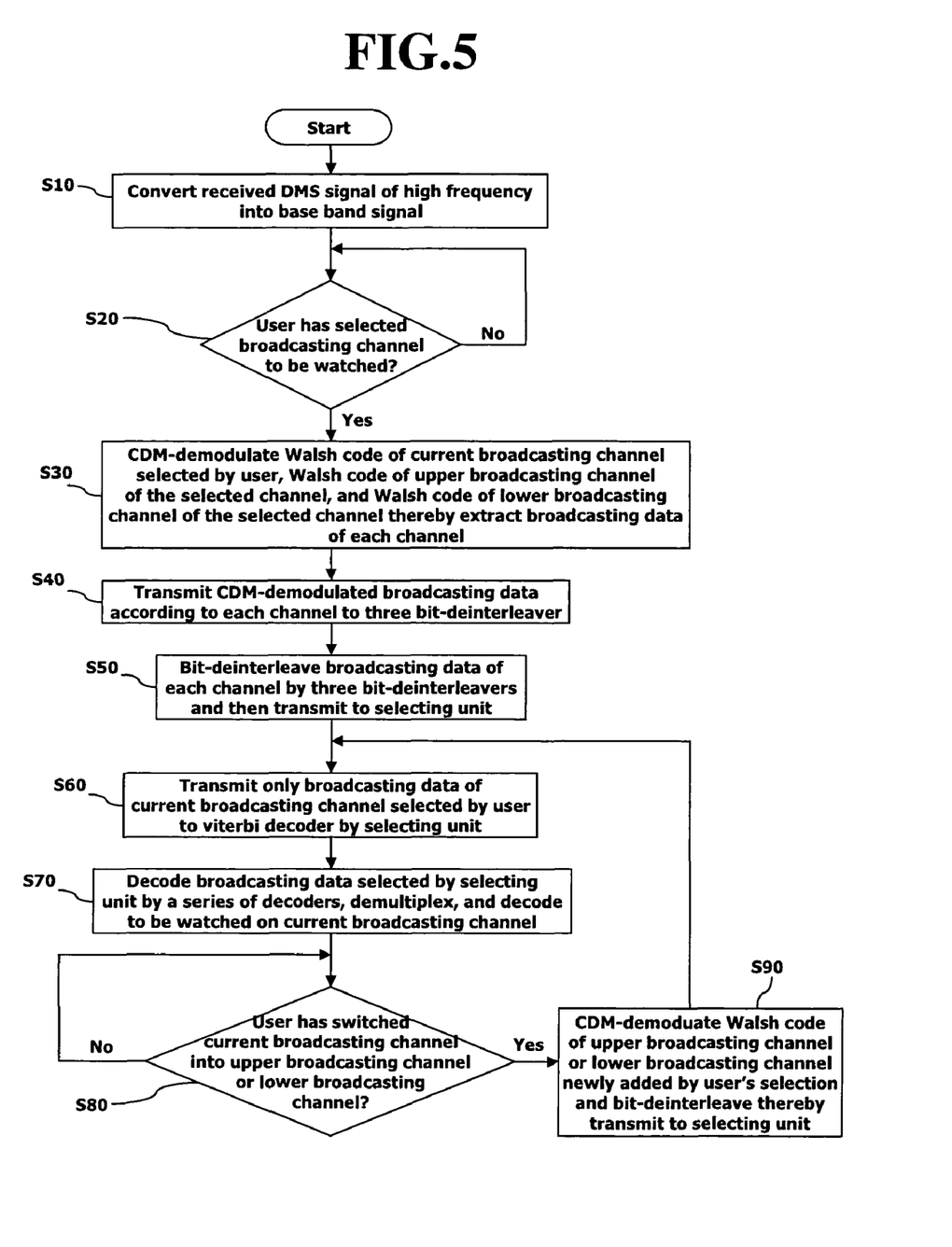
FIG. 5 is a flowchart showing a satellite DMB receiving method for minimizing a channel switching time according to the first embodiment of the present invention.

FIG. 5 is a flowchart showing a satellite DMB receiving method for minimizing a channel switching time according to the first embodiment of the present invention.

The satellite DMB receiving method for minimizing a channel switching time according to the first embodiment of the present invention is explained in more detail with reference to FIGS. 2 to 5.

The tuner converts a high frequency DMB signal received from an antenna through a single or multiple paths into a base band signal and then provides the base band signal to the CDM demodulator 220 (S10). The base band signal is a signal encoded with at least one Walsh code.

When the user selects a desired channel (for example, the CH8 of FIG. 3) (S20), the CDM demodulator 220 uses the corresponding Walsh codes (W14 and W15) to demodulate the broadcasting data of the selected broadcast channel, the Walsh codes (W16 and W17) corresponding to the upper broadcast channel CH9, and the Walsh codes (W11 and W12) corresponding to the lower broadcast channel CH7 thereby extracting broadcasting data according for each channel (S30). Then, the CDM demodulator 220 separates the broadcasting data of the current broadcast channel CH8 of FIG. 3, the upper broadcast channel CH9, and the lower broadcast channel CH7 from one another according to each channel and then provides the broadcasting data to each of the three bit de-interleavers 141 (S40).

Each of the three bit de-interleavers 141 performs a decoding process for bit de-interleaving the broadcasting data of each channel, and then provides the decoded broadcasting data to the selecting unit 210 (S50). The selecting unit 210 selects only the broadcasting data of the currently selected broadcast channel CH8 of FIG. 3, and provides the selected broadcasting data to the viterbi decoder 142 for decoding channel-coded data (S60).

The broadcasting data provided to the viterbi decoder 142 is decoded by the byte de-interleaver 143 and the Reed-Solomon decoder 144 in the same manner as the prior art, and then is demultiplexed and decoded. Accordingly, the broadcasting data of the current channel CH8 may be viewed (S70).

While viewing the video broadcasting of the current broadcast channel CH8 of FIG. 3, the user can switch to the upper broadcast channel CH9 or the lower broadcast channel CH7 (S80). If the user switches from the current channel CH8 to the upper broadcast channel CH9, the CDM demodulator 220 demodulates using the two Walsh codes (W18 and W19) corresponding the upper broadcast channel CH 10 of FIG. 3 to extract corresponding broadcasting data, and provides the broadcasting data to the bit de-interleaver 141. The bit de-interleaver 141 bit de-interleaves the broadcasting data and then provides the demodulated broadcasting data to the selecting unit 210 (S90). The broadcast channel CH9 of FIG. 3, switched by the user, is re-set to the current broadcast channel and broadcasting data of the current broadcast channel is decoded by the steps S60 and S70, enabling the user to view a video broadcast provided from the current broadcast channel.

The satellite DMB receiving method for minimizing channel switching time according to the first embodiment of the present invention is equally applied to the preset channels shown in FIG. 4.

The present invention was explained with respect to the video broadcast channels. However, the present invention may be applied to audio and data broadcast channels. In case of an audio broadcast channel, one Walsh code (for example, W10 of FIG. 3) is allocated to three audio broadcast channels (for example CH4 to CH6 of FIG. 3). Accordingly, even if the current broadcast channel CH5 of FIG. 3 is switched to the upper broadcast channel CH6 or the lower broadcast channel CH4, the same Walsh code W10 as the Walsh code W10 of the CH5 is allocated to the lower broadcast channel CH4 or the upper broadcast channel CH6. In this case, the Walsh code of the newly selected broadcast channel does not to be CDM-demodulated or bit de-interleaved.

Figure 6:
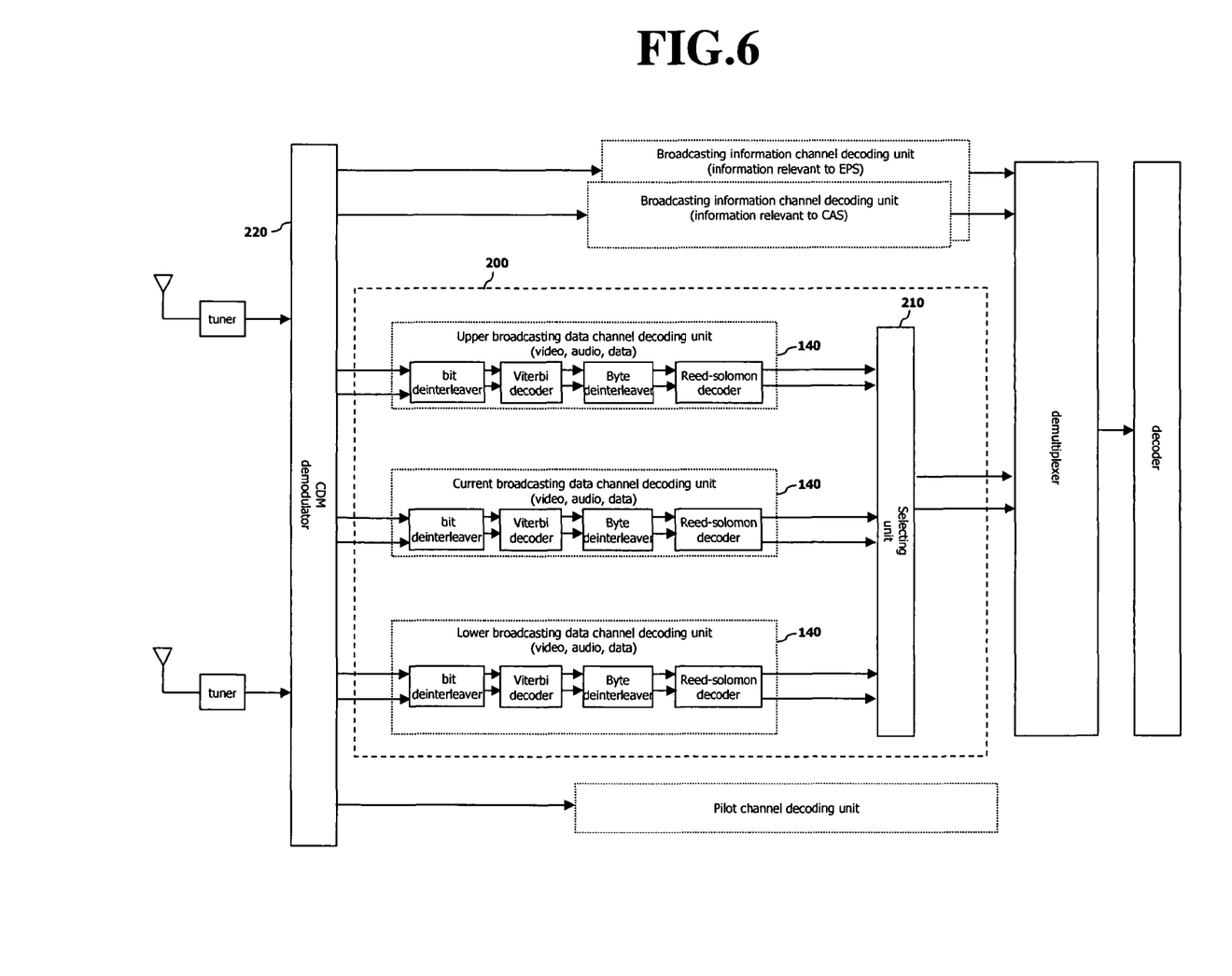
FIG. 6 is a block diagram showing a satellite DMB receiving apparatus based on a system E according to a second embodiment of the present invention.

FIG. 6 is a block diagram showing a satellite DMB receiving apparatus based on a system E according to another embodiment of the present invention.

The present invention according to a second embodiment is the same as the related art shown in FIG. 1 except for the broadcast channel data decoder 200. Accordingly, components having the same reference numerals as those of the related art have the same functions as those of the related art.

Referring to FIG. 6, the broadcast channel data decoder 200 comprises three broadcasting data channel decoding units 140 for performing a series of decoding processes for each of three broadcast channels, and a selecting unit 210.

The broadcasting data channel decoding units 140 decode broadcasting data of the current broadcast channel, the upper broadcasting data channel, and the lower broadcasting data channel. The selecting unit 210 extracts only broadcasting data of the broadcast channel selected by the user among broadcasting data decoded by the broadcasting data channel decoding units 140, thereby providing only the broadcasting data of the current broadcast channel to the demultiplexer.

The broadcasting data channel decoding units 140 for each channel of the present invention have the same construction and operation as those of the related art shown in FIG. 1. However, in this embodiment of the present invention, broadcasting data of the three broadcast channels is simultaneously decoded but only broadcasting data of the broadcast channel selected by the user is demultiplexed and decoded.

In case of switching a channel, the steps shown in FIG. 5 are applied.

As described above, in the satellite DMB receiving apparatus of the present invention, the channel decoding units 140 simultaneously de-interleave each of the three different broadcast channels. Accordingly, the delay caused by the decoding time when the user switches from one channel to another is greatly reduced thereby enhancing the quality of user viewing.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A satellite DMB receiving apparatus comprising:
   a selecting unit configured to select a first broadcast channel in a channel list, the channel list comprising a plurality of broadcast channels including the selected first broadcast channel, two second broadcast channels and a plurality of additional broadcast channels, at least one first Walsh code being allocated to the selected first broadcast channel, at least one second Walsh code being allocated to the two second broadcast channels and at least one third Walsh code being allocated to at least some of the plurality of additional broadcast channels, the two second broadcast channels being channels nearest the selected first broadcast channel among the plurality of broadcast channels, and the at least one second Walsh code differing from the at least one first Walsh code;

a plurality of demodulators configured to demodulate Walsh encoded data of the selected first broadcast channel and the two second broadcast channels;

a plurality of bit de-interleavers configured to de-interleave broadcasting data of the selected first broadcast channel and broadcasting data of the two second broadcast channels; and a broadcasting data channel decoding unit configured to decode broadcasting data of the selected first broadcast channel and broadcasting data of the two second broadcast channels, wherein the selecting unit is positioned between the plurality of bit de-interleavers and the broadcasting data channel decoding unit, wherein at least one of the plurality of additional broadcast channels is allocated to the at least one first Walsh code or to the at least one second Walsh code, wherein the two second broadcast channels comprise an upper broadcasting channel adjacent to the selected first broadcasting channel and a lower broadcasting channel adjacent to the selected first broadcasting channel, and wherein the plurality of bit de-interleavers are further configured to simultaneously bit de-interleave the broadcasting data of the selected first broadcast channel and the broadcasting data of the two second broadcast channels.

2. The apparatus of claim 1, wherein two Walsh codes are allocated for each of the plurality of broadcast channels that is a video channel.

3. The apparatus of claim 1, wherein one Walsh code is allocated for each of the plurality of broadcast channels that is an audio or data channel.

4. The apparatus of claim 1, wherein the plurality of bit de-interleavers comprises at least three bit de-interleavers, one for the selected first broadcast channel and one for each of the two second broadcast channels.

5. The apparatus of claim 1, wherein the broadcasting data channel decoding unit comprises at least one of a Viterbi decoder, a byte de-interleaver, and a Reed-Solomon decoder.

6. The apparatus of claim 5, wherein the Viterbi decoder, the byte de-interleaver, and the Reed-Solomon decoder of the broadcasting data channel decoding unit are constructed in pairs.

7. A satellite DMB receiving method, comprising:

selecting a first broadcast channel in a channel list via a selecting unit, the channel list comprising a plurality of broadcast channels including the selected first broadcast channel, two second broadcast channels and a plurality of additional broadcast channels, at least one first Walsh code being allocated to the selected first broadcast channel, at least one second Walsh code being allocated to the two second broadcast channels and at least one third Walsh code being allocated to at least some of the plurality of additional broadcast channels, the two second broadcast channels being channels nearest the selected first broadcast channel among the plurality of broadcast channels, and the at least one second Walsh code differing from the at least one first Walsh code;

demodulating Walsh encoded data of the selected first broadcast channel and the two second broadcast channels;

bit de-interleaving broadcasting data of the selected first broadcast channel and broadcasting data of the two second broadcast channels;

decoding the demodulated broadcasting data of the selected first broadcast channel and broadcasting data of the two second broadcast channels; and demultiplexing the broadcasting data of the selected first broadcast channel to process the selected broadcasting data into an image that can be viewed, wherein at least one of the plurality of additional broadcast channels is allocated to the at least one first Walsh code or to the at least one second Walsh code, wherein the two second broadcast channels comprise an upper broadcasting channel adjacent to the selected first broadcasting channel and a lower broadcasting channel adjacent to the selected first broadcasting channel, and wherein the broadcasting data of the selected first broadcast channel and the broadcasting data of the two second broadcast channels are simultaneously bit de-interleaved.

8. A satellite DMB receiving apparatus comprising:

a selecting unit configured to select a first broadcast channel in a channel list, the channel list comprising a plurality of broadcast channels including the selected first broadcast channel, two second broadcast channels and a plurality of additional broadcast channels, a first one or more Walsh code being allocated to the selected first broadcast channel, a second one or more Walsh code being allocated to the two second broadcast channels and one or more Walsh code being allocated to each of the plurality of additional broadcast channels, the two second broadcast channels being channels nearest the selected first broadcast channel in the channel list and the second one or more Walsh code differing from the first one or more Walsh code;

a plurality of demodulators configured to demodulate Walsh encoded data of the selected first broadcast channel and the two second broadcast channels;

a plurality of bit de-interleavers configured to de-interleave broadcasting data of the selected first broadcast channel and broadcasting data of the two second broadcast channels;

a plurality of broadcasting data channel decoding units configured to decode the selected first broadcast channel and the two second broadcast channels; and a demultiplexer configured to demultiplex the selected first broadcast channel and the two second broadcast channels according to the selected channel to process broadcasting data of the selected first broadcast channel into an image that can be viewed, wherein the selecting unit is positioned between the plurality of broadcasting data channel decoding units and the demultiplexer, the selecting unit being further configured to extract only broadcasting data of the selected first broadcast channel and the two second broadcast channels and to provide the extracted broadcasting data to the demultiplexer, wherein at least one of the plurality of additional broadcast channels is allocated to the at least one first Walsh code or to the at least one second Walsh code, wherein the two second broadcast channels comprise an upper broadcasting channel adjacent to the selected first broadcasting channel and a lower broadcasting channel adjacent to the selected first broadcasting channel, and wherein plurality of bit de-interleavers are further configured to simultaneously bit de-interleave the broadcasting data of the selected first broadcast channel and the broadcasting data of the two second broadcast channels.

9. The apparatus of claim 8, wherein two Walsh codes are allocated for each of the plurality of broadcast channels that is a video channel.

10. The apparatus of claim 9, wherein one Walsh code is allocated for each of the plurality of broadcast channels that is an audio or data channel.

11. The apparatus of claim 8, wherein the plurality of bit de-interleavers comprises three bit de-interleavers, one for the selected first broadcast channel and one for each of the two second broadcast channels.

12. The apparatus of claim 8, wherein the plurality of broadcasting data channel decoding units comprise at least one of a Viterbi decoder, a byte de-interleaver, or a Reed-Solomon decoder.

13. The apparatus of claim 12, wherein the Viterbi decoder, the byte de-interleaver and the Reed-Solomon decoder are constructed in pairs.

14. A satellite DMB receiving method, comprising:

selecting a first broadcast channel in a channel list via a selecting unit, the channel list comprising a plurality of broadcast channels including the selected first broadcast channel, two second broadcast channels and a plurality of additional broadcast channels, a first one or more Walsh code being allocated to the selected first broadcast channel, a second one or more Walsh code being allocated to the two second broadcast channels and one or more Walsh code being allocated to each of the plurality of additional broadcast channels, the two second broadcast channels being channels nearest the selected first broadcast channel in the channel list and the second one or more Walsh code differing from the first one or more Walsh code;

demodulating Walsh encoded data of the selected first broadcast channel and the two second broadcast channels via a plurality of demodulators;

bit de-interleaving broadcasting data of the selected first broadcast channel and the two second broadcast channels via a plurality of corresponding bit de-interleavers;

decoding the demodulated Walsh encoded data of the selected first broadcast channel and the demodulated Walsh encoded data of the two second broadcast channels; and demultiplexing the broadcasting data of the selected first broadcast channel to process the broadcasting data of the selected first broadcast channel into an image that can be viewed, wherein at least one of the plurality of additional broadcast channels is allocated to the at least one first Walsh code or to the at least one second Walsh code, wherein the two second broadcast channels comprise an upper broadcasting channel adjacent to the selected first broadcasting channel and a lower broadcasting channel adjacent to the selected first broadcasting channel, and wherein the broadcasting data of the selected first broadcast channel and the broadcasting data of the two second broadcast channels are simultaneously bit de-interleaved.

* * * * *